(12) United States Patent
Koda et al.

(10) Patent No.: US 7,903,525 B2
(45) Date of Patent: Mar. 8, 2011

(54) HOLOGRAM RECORDING APPARATUS AND METHOD, COMPUTER PROGRAM, AND HOLOGRAM RECORDING MEDIUM

(75) Inventors: Takeshi Koda, Saitama (JP); Nobuyuki Takakuwa, Saitama (JP); Yasuko Fukuda, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 456 days.

(21) Appl. No.: 12/091,275

(22) PCT Filed: Oct. 24, 2006

(86) PCT No.: PCT/JP2006/321096
§ 371 (c)(1),
(2), (4) Date: Jul. 10, 2008

(87) PCT Pub. No.: WO2007/049577
PCT Pub. Date: May 3, 2007

(65) Prior Publication Data
US 2009/0262628 A1 Oct. 22, 2009

(30) Foreign Application Priority Data
Oct. 24, 2005 (JP) .................................. 2005-308279

(51) Int. Cl.
*G11B 7/00* (2006.01)
(52) U.S. Cl. ...... 369/103; 369/100; 369/47.1; 369/275.1
(58) Field of Classification Search .................. None
See application file for complete search history.

(56) References Cited

U.S. PATENT DOCUMENTS

| 7,800,802 B2 * | 9/2010 | Kaneko et al. ............ 369/109.02 |
| 2007/0146843 A1 * | 6/2007 | Mitasaki et al. ................ 359/22 |

FOREIGN PATENT DOCUMENTS

| JP | 9-305978 | 11/1997 |
| JP | 2003-178473 | 6/2003 |
| JP | 2005-71528 | 3/2005 |
| JP | 2005-196826 | 7/2005 |
| JP | 2005-216422 | 8/2005 |

OTHER PUBLICATIONS

U.S. Appl. No. 12/091,154, Takeshi Koda et al., filed Apr. 22, 2008, (JP 2005-308283).
International Search Report for International Application No. PCT/JP2006/321096, mailed Dec. 12, 2006.

* cited by examiner

*Primary Examiner* — Muhammad N Edun
(74) *Attorney, Agent, or Firm* — Nixon & Vanderhye P.C.

(57) ABSTRACT

A hologram recording apparatus (300) records record information into a hologram recording medium (100) on which a hologram recording layer (11) and a position information recording layer (13). The hologram recording apparatus is provided with: a first recording device (101) for recording the record information into the hologram recording layer; and a second recording device (121) for setting an area portion of the position information recording layer in a recorded state, the area portion of the position information recording layer corresponding to an area portion of the hologram recording layer in which the record information is recorded.

17 Claims, 12 Drawing Sheets

[FIG. 1]
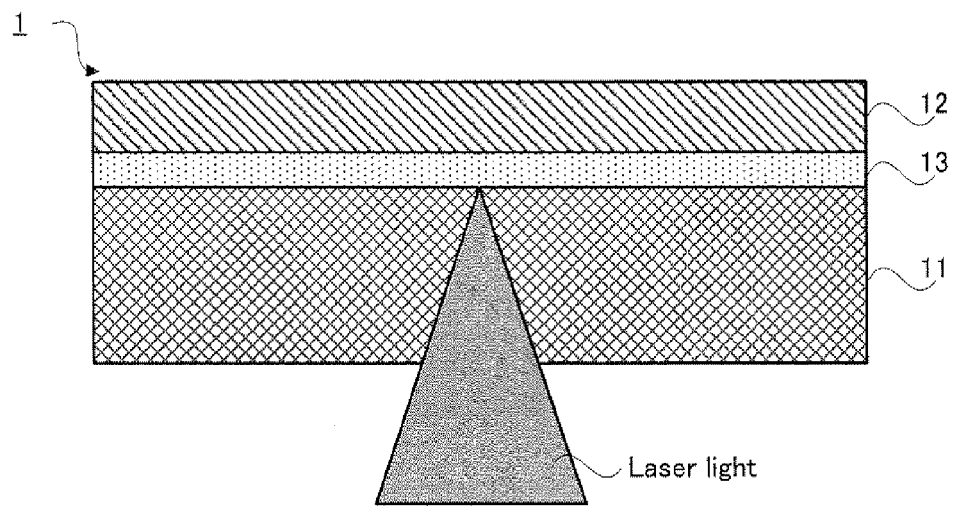
(a)
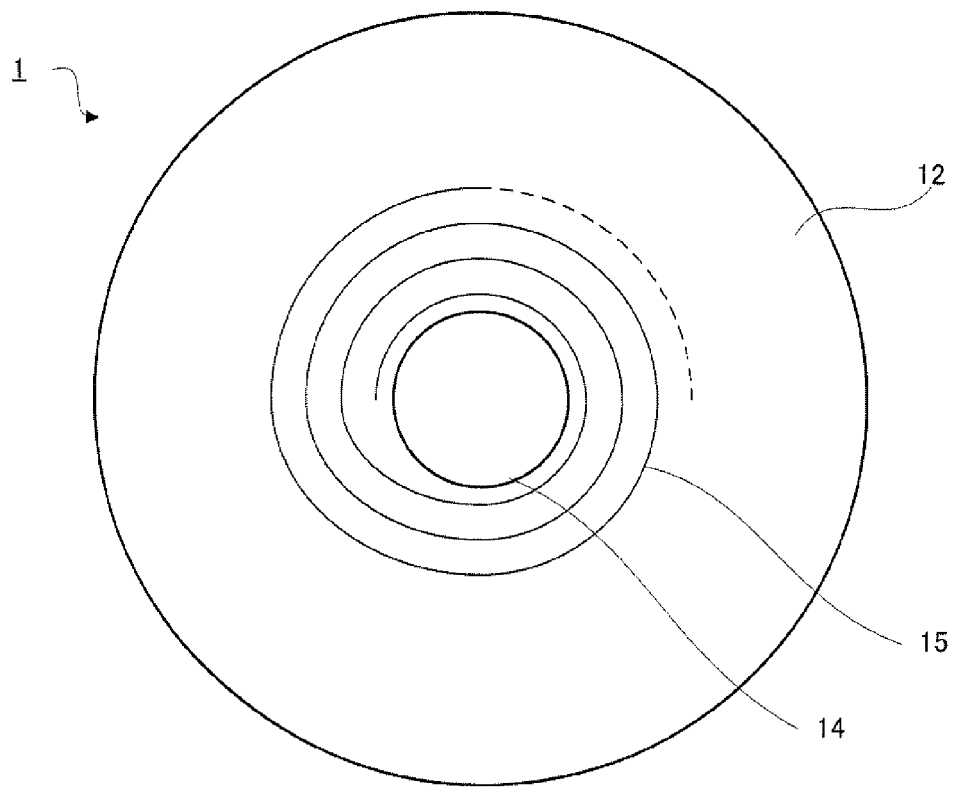
(b)

[FIG. 2]
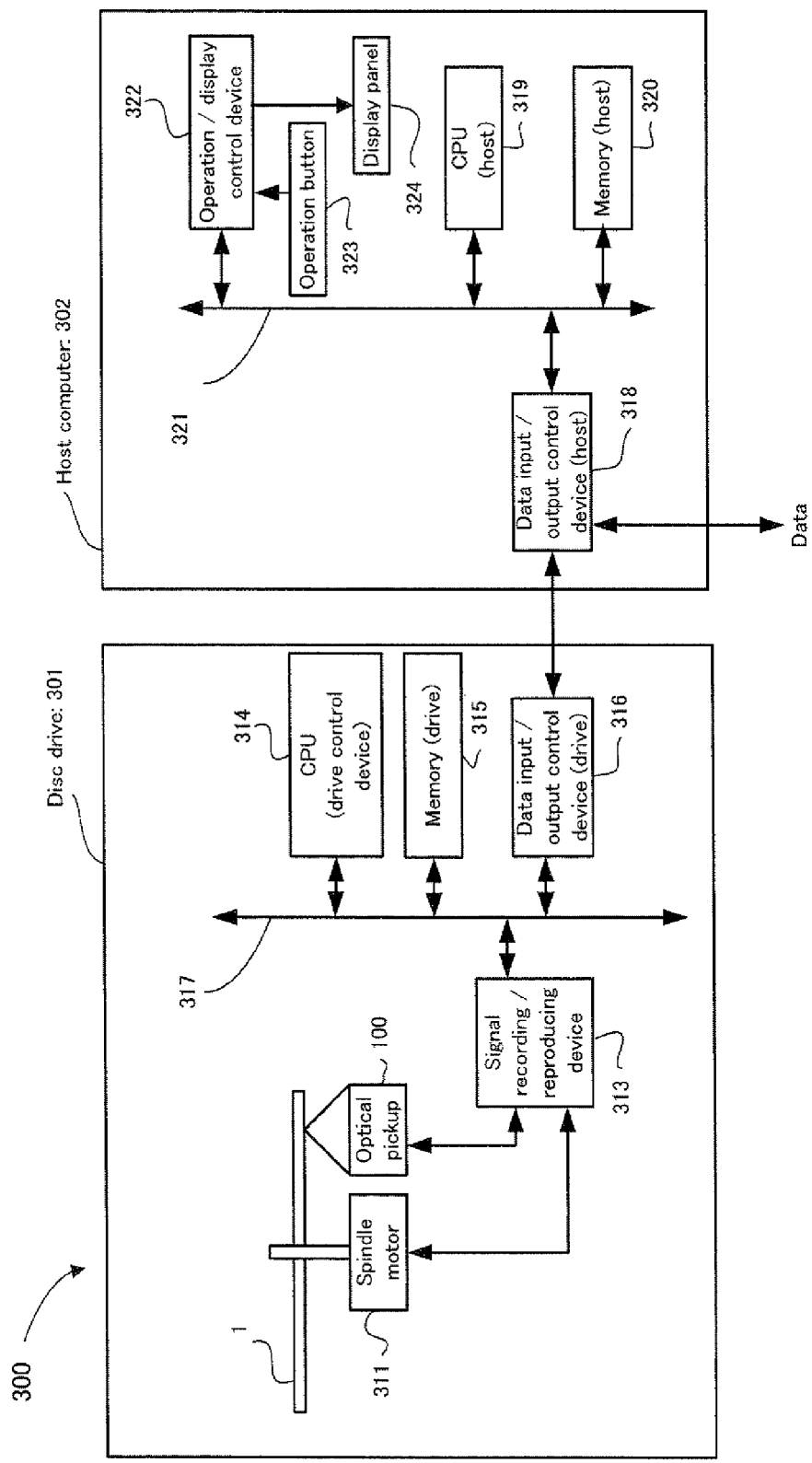

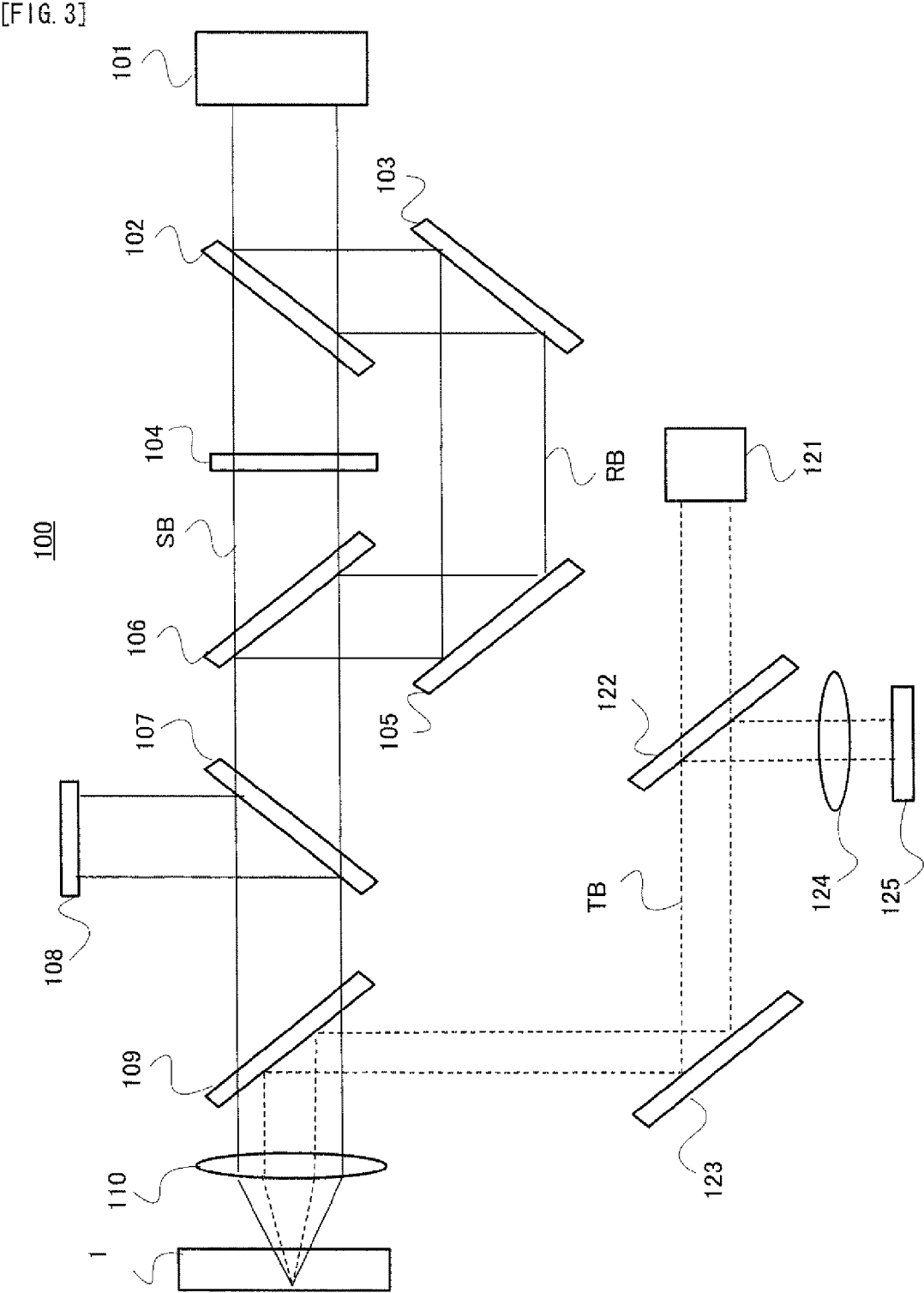

[FIG. 4]
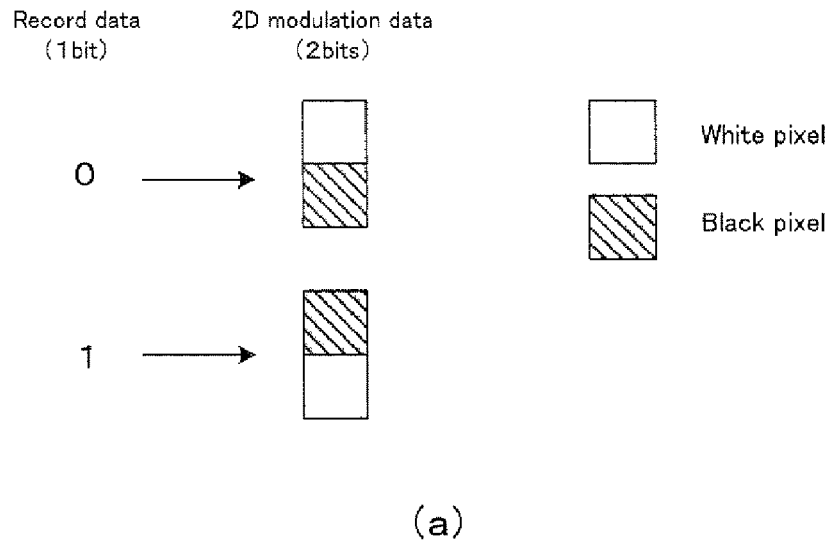
(a)
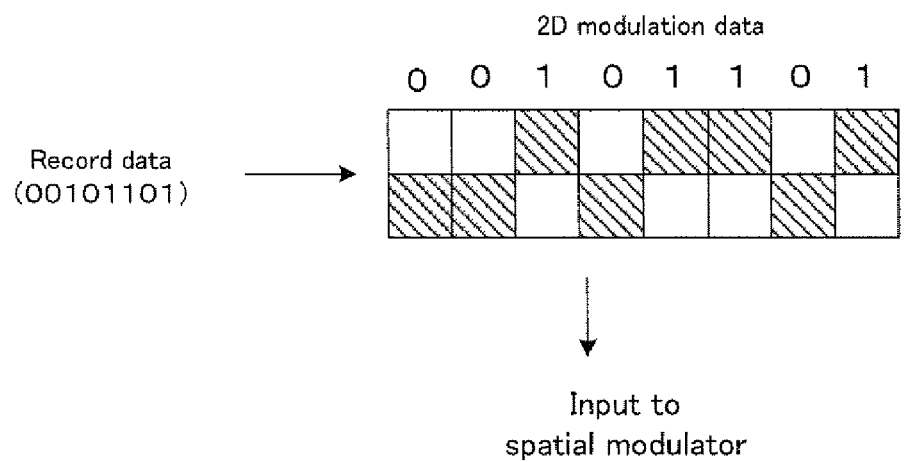
(b)

[FIG. 5]
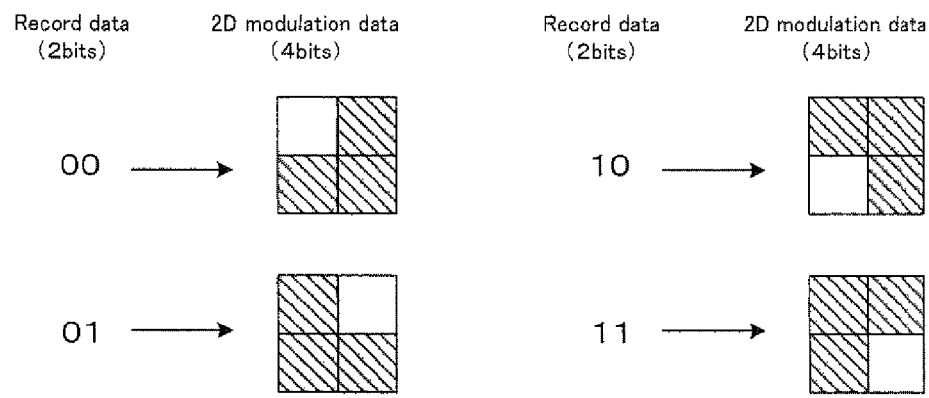
(a)
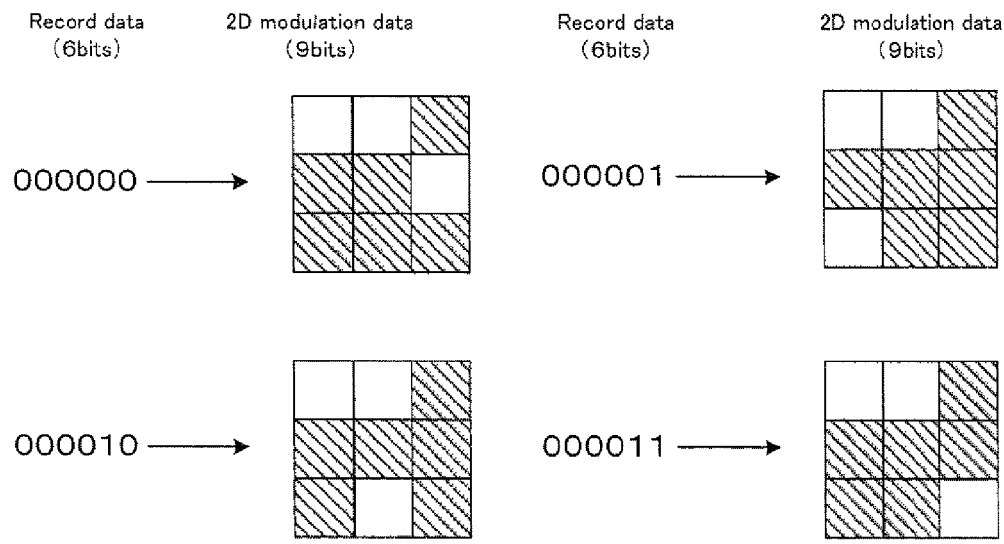
(b)

[FIG. 6]
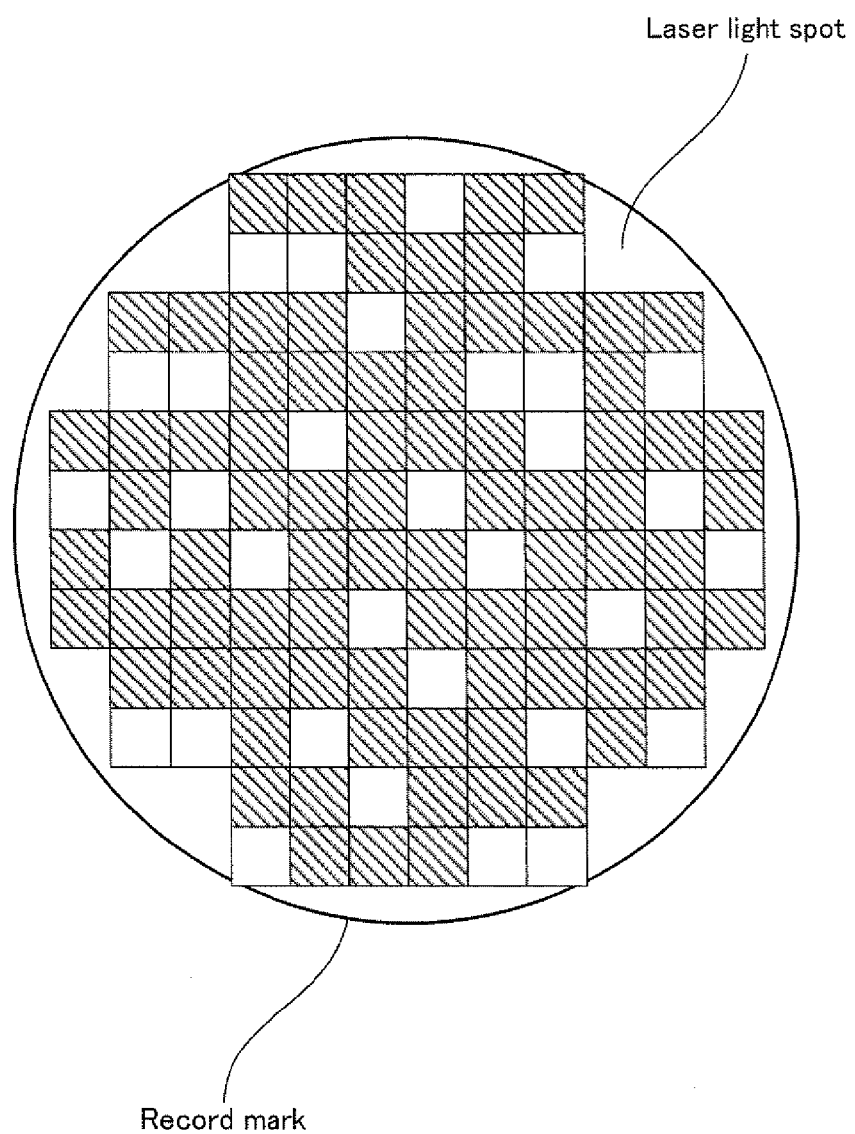

[FIG. 7]
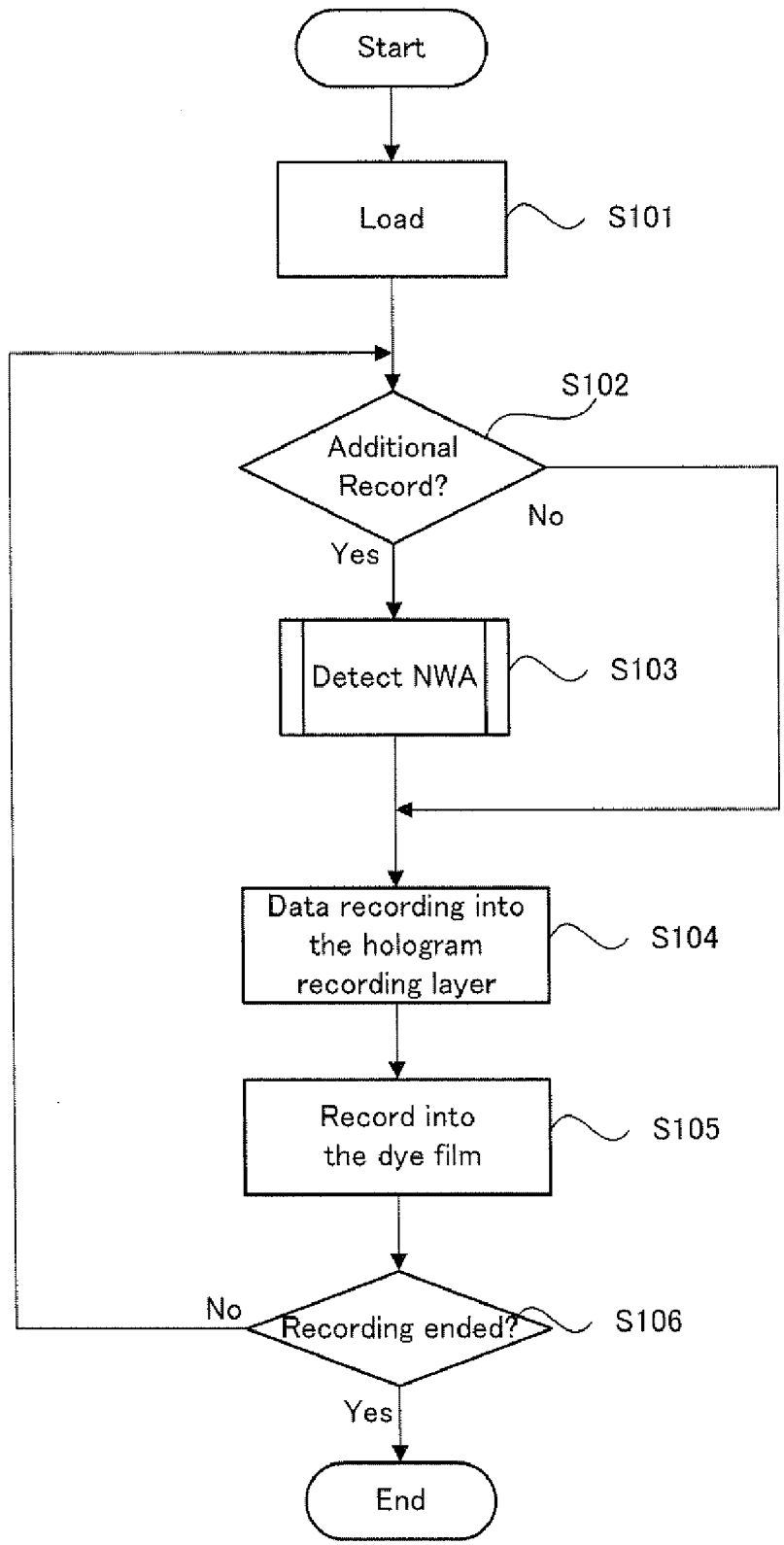

[FIG. 8]
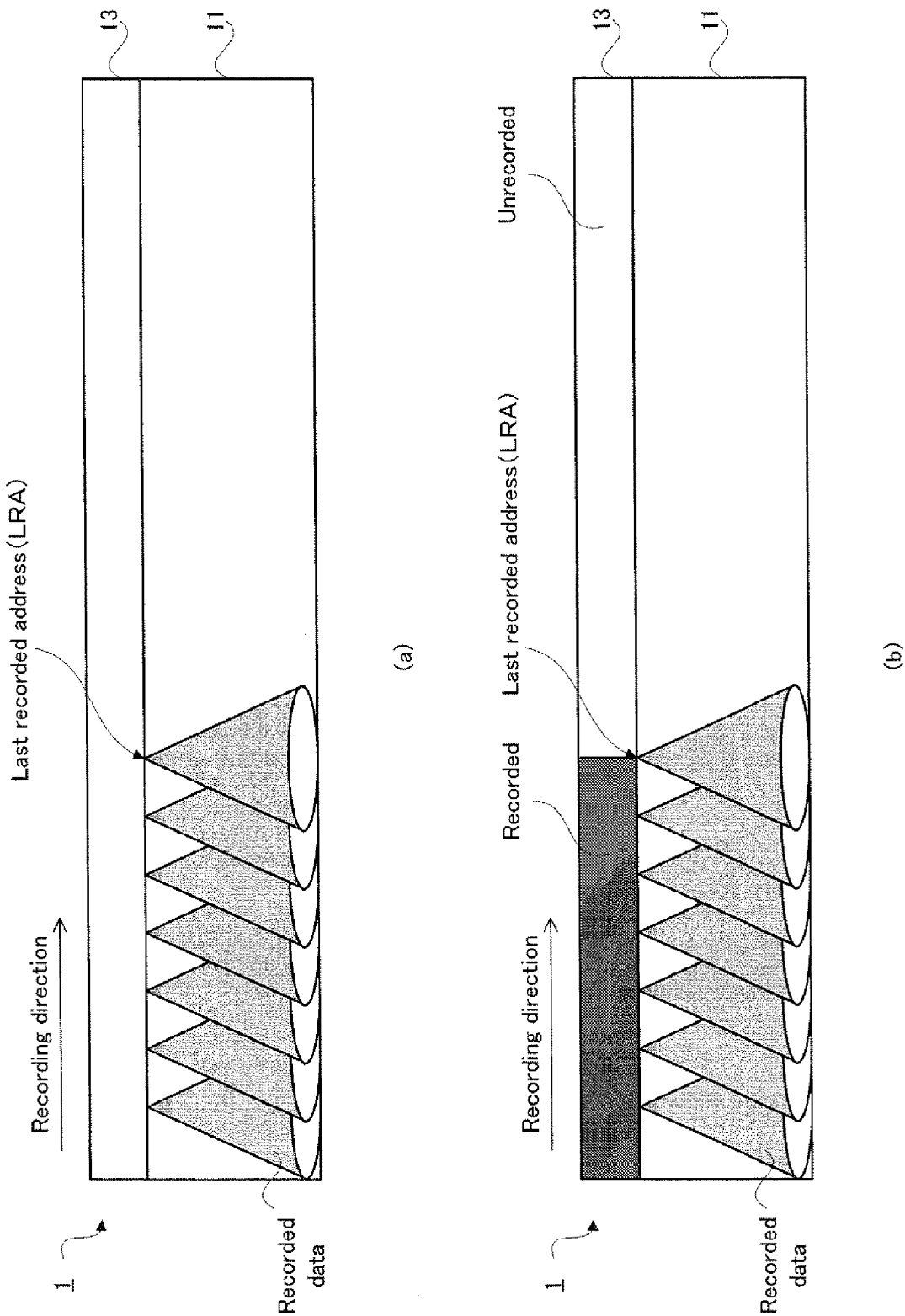

[FIG. 9]
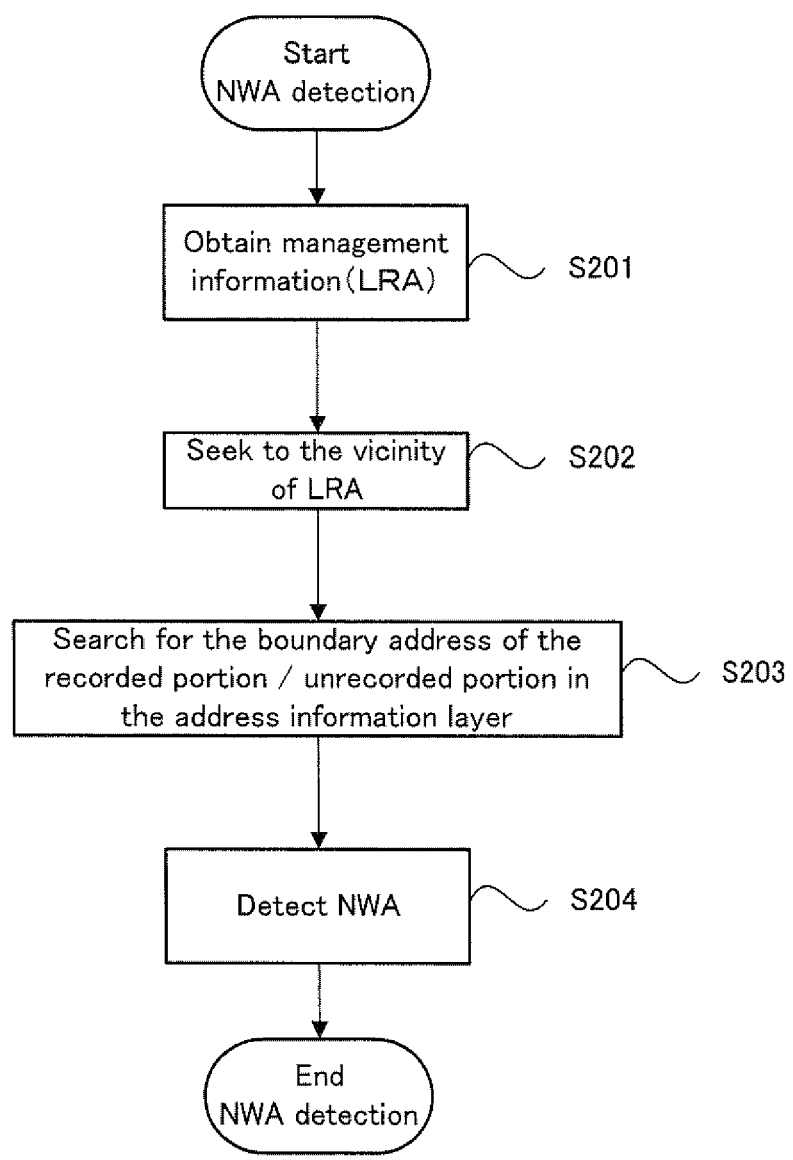

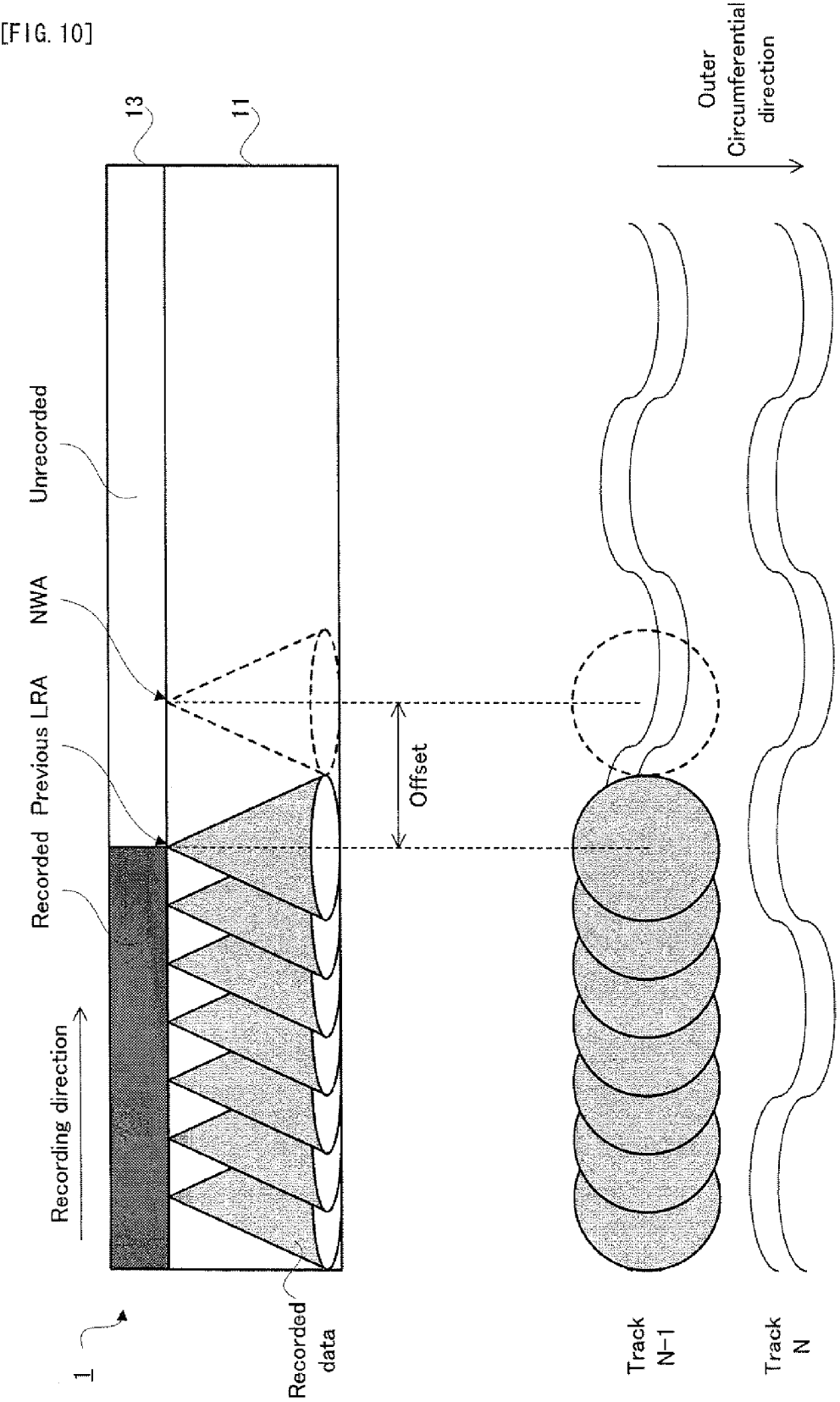
[FIG. 10]

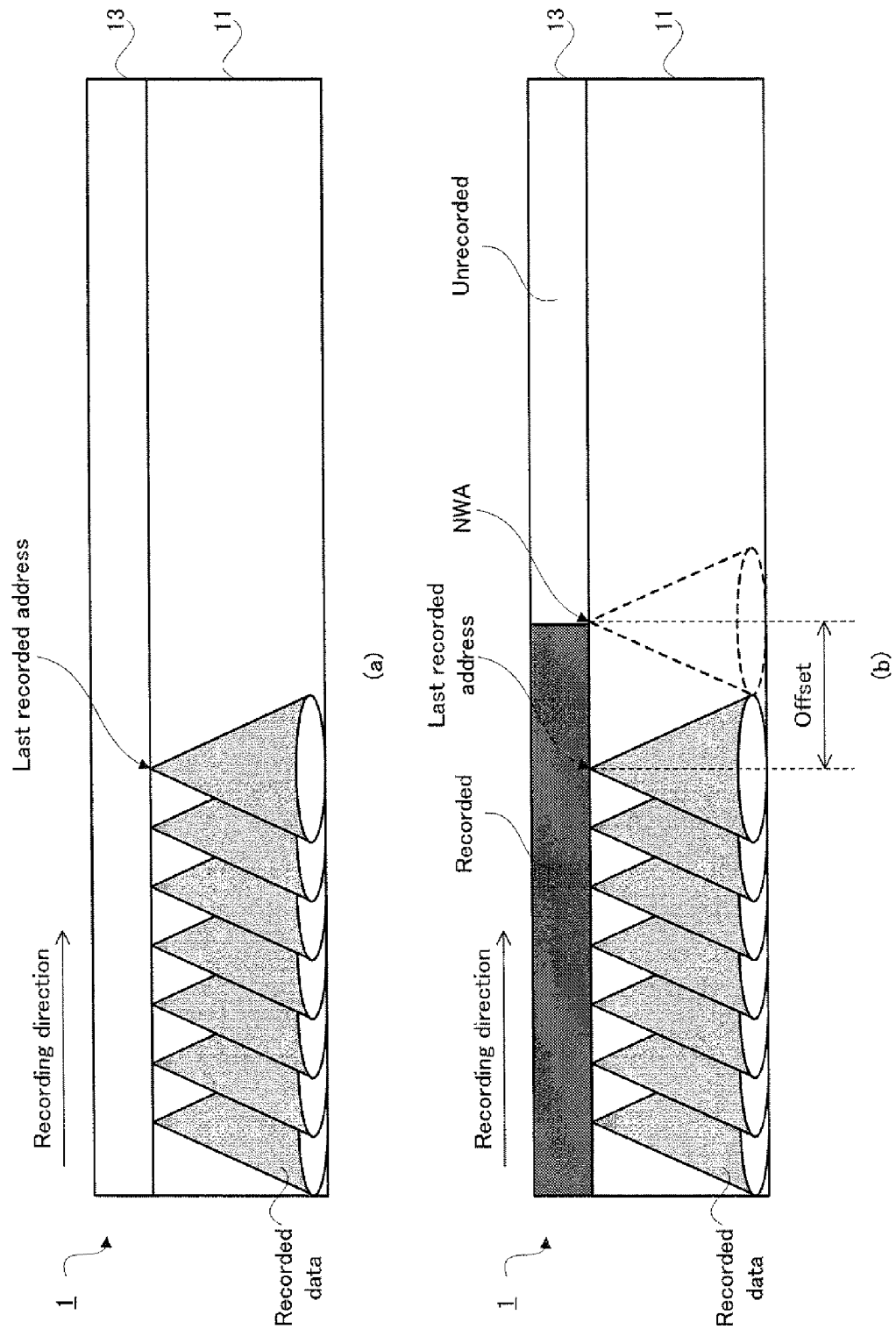
[FIG. 11]

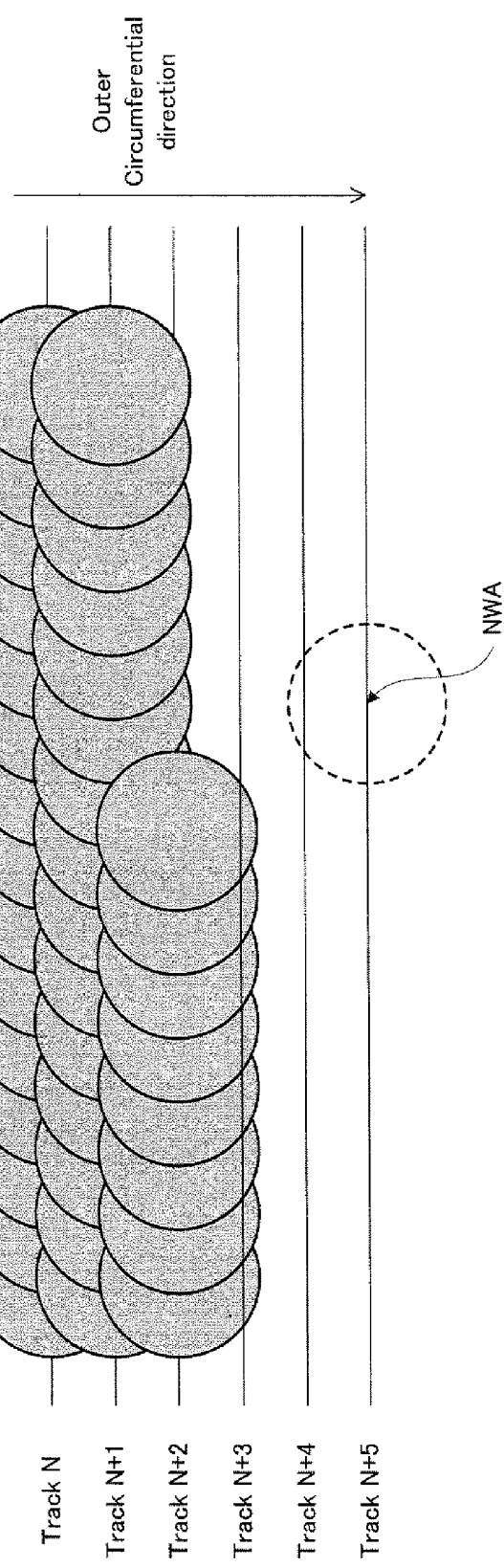

HOLOGRAM RECORDING APPARATUS AND METHOD, COMPUTER PROGRAM, AND HOLOGRAM RECORDING MEDIUM

This application is the U.S. national phase of International Application No. PCT/JP2006/321096, filed 24 Oct. 2006, which designated the U.S. and claims priority to JP 2005-308279, filed 24 Oct. 2005, the entire contents of each of which are hereby incorporated by reference.

TECHNICAL FIELD

The present invention relates to a hologram recording apparatus for and a hologram recording method of recording information into a hologram recording medium, a computer program used for the hologram recording apparatus, and the hologram recording medium.

BACKGROUND ART

There is known a hologram recording technique of recording data to be recorded, as an interference pattern, into a hologram recording medium. In one method, light from a light source is spatially-modulated in accordance with the data to be recorded, by using a modulation pattern obtained by combining two-dimensional white and black patterns which are generated in accordance with a predetermined modulation rule, to thereby generate information light, and the recording medium is irradiated with the signal light and reference light The information light and the reference light form the interference pattern on the recording medium, and the interference pattern is recorded into a recording layer of the recording medium. On the other hand, in reproduction, the interference pattern recorded in the recording medium is irradiated with only the reference light, and detection light from the recording medium is detected by a two-dimensional (2D) sensor, to thereby reproduce the data As in the information recording onto an optical disc or the like, even in the hologram recording, object light and the reference light are focused on the recording medium by using an objective lens or the like. Therefore, in order to accurately perform the information recording and reproduction, addressing control and tracking servo control are required, wherein the addressing control is to preferably recognize a position on the hologram recording medium and the tracking servo control is to control the position of the objective lens with respect to the hologram recording medium. In order to perform the addressing control and the tracking servo control, it is possible to use the hologram recording medium provided with: a hologram recording layer to record therein data; and an address information layer to record therein an address or the like (refer to patent documents 1 and 2). With respect to such a hologram recording medium, it is possible to record the data into the hologram recording medium while preferably performing the addressing control and the tracking servo control or the like, for example, by recording the data into the hologram recording layer with blue laser light and by reading the address or the like recorded in the address information layer with red laser light.

Patent document 1: Japanese Patent Application Laid Open NO. 2005-196826

Patent document 2: Japanese Patent Application Laid Open NO. 2005-71528

DISCLOSURE OF INVENTION

Subject to be Solved by the Invention

In general, it is expected, even in the hologram recording medium, that sequential recording is performed, as in an optical disc such as a DVD, in order to efficiently use its recording capacity. In performing the sequential recording, an operation which restarts the recording after the recording is once stopped (i.e. write-once or additional recording operation) is frequently performed. In this case, it is necessary to restart the data recording after the detection of an address at which the data can be recorded next (hereinafter referred to as an "NWA (Next Writable Address)". In the optical disc such as a DVD, the NWA can be detected relatively easily, by using a difference between signal intensity in an area portion in which the data is recorded and signal intensity in an area portion in which the data is unrecorded. That is, by seeking the recording medium while irradiating it with the laser light and by monitoring the signal intensity of the reflective light of the laser light, a boundary of the area portion in which the data is recorded and the area portion in which the data is unrecorded can be detected as the NWA. The hologram recording medium, however, has such a technical problem that it is hard to detect the boundary of the area portion in which the data is recorded and the area portion in which the data is unrecorded if the detection light from the hologram recording medium is not actually decoded. Thus, it is necessary to spend a lot of time to detect the NWA.

With regard to the subject to be solved by the present invention, the above can be listed as one example. It is therefore an object of the present invention to provide a hologram recording apparatus and method, which allow the NWA on a hologram recording medium to be detected relatively easily, a computer program which makes a computer as such a hologram recording apparatus, and the hologram recording medium.

Means for Solving the Subject (Hologram Recording Apparatus)

The above object of the present invention can be achieved by a hologram recording apparatus for recording record information into a hologram recording medium on which a hologram recording layer and a position information recording layer are laminated, the record information being recorded into the hologram recording layer, the hologram recording apparatus provided with: a first recording device for recording the record information into the hologram recording layer; and a second recording device for setting an area portion of the position information recording layer in a recorded state, the area portion of the position information recording layer corresponding to an area portion of the hologram recording layer in which the record information is recorded.

According to the hologram recording apparatus of the present invention, by the operation of the first recording device, the record information including video information, audio information, information for PC, or the like can be recorded into the hologram recording layer on the hologram recording medium. More specifically, by modulating the record information in accordance with a modulation rule related to the hologram recording/reproduction, a modulation pattern is generated from the record information. The modulation pattern is used in spatial-modulating the laser light emitted from an optical pickup or the like, which constitutes one specific example of the first recording device. The spatial-modulated laser light (i.e. information light or signal light) interferences with reference light of the laser light emitted from the optical pickup. Thereby, an interference pattern is recorded into the hologram recording layer on the hologram recording medium. By this, the record information can be recorded into the hologram recording layer.

In particular in the present invention, after or in parallel with the recording of the record information by the first recording device, by the operation of the second recording device, the area portion of the position information recording layer corresponding to the area portion of the hologram recording layer in which the record information is recorded is set in the recorded state without influence on the hologram recording layer, by irradiating the laser light or the like with a wavelength different from a wavelength for performing the recording/reproduction on the hologram recording layer. The position information recording layer is laminated on the hologram recording layer, and it is unrecorded in the initial state. Therefore, the area portion of the position information recording layer corresponding to the area portion of the hologram recording layer in which the record information is not recorded is in the unrecorded state. Incidentally, the "recorded state" herein indicates the state that there is a distinguishable difference in the signal intensity of reflected light, compared to the unrecorded state. Moreover, "corresponding to" indicates the state of being in substantially the same radial position, or being in substantially the same position viewed from the irradiation side of the laser light.

As described above, by setting the position information recording layer in the recorded state in accordance with an aspect of recording the record information into the hologram recording layer, it is possible to detect the position at which the record information is to be recorded next (i.e. NWA), relatively easily. Specifically, for example, by seeking the position information recording layer while irradiating it with the laser light or the like with the wavelength different from the wavelength for performing the recording/reproduction on the hologram recording layer, it is possible to detect the boundary of the area portion in the recorded state and the area portion in the unrecorded state in the position information recording layer, relatively easily. Moreover, even if such a detection operation is performed, there is no adverse effect on the hologram recording layer (incorrect deletion/incorrect recording or the like). The boundary of the area portion in the recorded state and the area portion in the unrecorded state in the position information recording layer substantially corresponds to a boundary of an area portion in which the record information is recorded and an area portion in which the record information is unrecorded in the hologram recording layer. Then, the boundary of the area portion in which the record information is recorded and the area portion in which the record information is unrecorded in the hologram recording layer directly or indirectly indicates the position (or its vicinity) at which the record information is to be recorded next in the hologram recording layer. Thus, on the basis of the position of the boundary of the area portion in the recorded state and the area portion in the unrecorded state in the position information recording layer, it is possible to detect the position at which the record information is to be recorded next in the hologram recording layer, relatively easily. In other words, without reproducing the record information recorded in the hologram recording layer, it is possible to detect the position at which the record information is to be recorded next in the hologram recording layer, relatively easily.

Incidentally, in the aforementioned hologram recording apparatus, the second recording device sets the area portion of the position information recording layer which is unrecorded in the initial state, in the recorded state; however, on the contrary, the second recording device may set the area portion of the position information recording layer which is recorded in the initial state, in the unrecorded state. The point is that the state of the area portion of the position information recording layer is changed so as to relatively easily detect the boundary of an area portion in a first state and an area portion in a second state, which is different from the first state, in the position information recording layer, by which the aforementioned various benefits can be received. In summary, as another aspect of the hologram recording apparatus of the present invention, it may be a hologram recording apparatus for recording record information into a hologram recording medium on which a hologram recording layer and a position information recording layer are laminated, the record information being recorded into the hologram recording layer, the position information recording layer being in a first state in an initial state, the hologram recording apparatus provided with: a first recording device for recording the record information into the hologram recording layer; and a second recording device for setting an area portion of the position information recording layer in a second state which is different from the first state, the area portion of the position information recording layer corresponding to an area portion of the hologram recording layer in which the record information is recorded.

Moreover, the hologram recording layer and the position information recording layer are laminated on the hologram recording medium used in the present invention; however, the hologram recording layer and the position information recording layer may be laminated to be adjacent to each other, or the hologram recording layer and the position information recording layer may laminated with another layer therebetween. In any case, the aforementioned benefits can be preferably received.

In one aspect of the hologram recording apparatus of the present invention, the position information recording layer includes a dye film, and the second recording device sets the area portion of the position information recording layer in the recorded state by thermal destruction of the dye film.

According to this aspect, the thermal destruction can be caused by irradiating the dye film with e.g. laser light or the like. As a result, it is possible to set the position information recording layer in the recorded state, relatively easily.

In another aspect of the hologram recording apparatus of the present invention, the second recording device sets the area portion of the position information recording layer in the recorded state by recording predetermined information.

According to this aspect, it is also possible to record disc management information or the record information including video information, audio information, information for PC, or the like, into the position information recording layer. By this, it is possible to relatively increase a recording capacity of the hologram recording medium. Of course, it is also possible to set the area portion of the position information recording layer in the recorded state by recording information that has no meaning (e.g. dummy information or the like).

In another aspect of the hologram recording apparatus of the present invention, the first recording device sequentially records the record information, and the second recording device sequentially sets the area portion of the position information recording layer in the recorded state.

According to this aspect, with performing the sequential recording, it is possible to preferably receive the aforementioned various benefits.

In another aspect of the hologram recording apparatus of the present invention, the second recording device sets the area portion of the position information recording layer facing the area portion of the hologram recording layer in which the record information is recorded, in the recorded state, as the area portion of the position information recording layer corresponding to the area portion of the hologram recording layer in which the record information is recorded.

According to this aspect, by the operation of the second recording device, the area portion of the position information recording layer facing (e.g. in the same radial position as or in the same position as, viewed from the irradiation side of the laser light) the area portion of the hologram recording layer in which the record information is recorded is set in the recorded state. By this, it is possible to detect the position at which the record information is to be recorded next in the hologram recording layer, relatively easily.

In an aspect of the hologram recording apparatus in which the area portion of the position information recording layer facing the area portion of the hologram recording layer in which the record information is recorded is set in the recorded state, as described above, it may be further provided with: a first detecting device for detecting a position of a boundary between the area portion in the recorded state and an area portion in an unrecorded state in the position information recording layer; and a second detecting device for detecting a position on the hologram recording layer at which the record information is to be recorded next, on the basis of the detected position of the boundary.

By virtue of such construction, by the operations of the first detecting device and the second detecting device, it is possible to detect the position at which the record information is to be recorded next in the hologram recording layer, relatively easily.

In an aspect of the hologram recording apparatus provided with the first detecting device and the second detecting device, as described above, the second detecting device may detect a position ahead from the detected position of the boundary by a predetermined size of an offset portion, as the position on the hologram recording layer at which the record information is to be recorded next.

By virtue of such construction, with multiplexed recording of the record information, it is possible to preferably receive the aforementioned various benefits.

In an aspect of the hologram recording apparatus in which the position ahead from the detected position of the boundary by the predetermined size of the offset portion is detected as the position on the hologram recording layer at which the record information is to be recorded next, as described above, if a track pitch of the hologram recording medium is greater than a size of a diameter of a record mark, which is formed on the hologram recording layer by recording the record information, the predetermined size may be at least the size of the diameter of the record mark.

By virtue of such construction, if the recording is restarted (i.e. additionally recorded), new record information can be recorded without overlapping the record mark of the record information which is recorded before. By this, it is possible to preferably receive the aforementioned various benefits, while multiplex-recording of the record information.

In an aspect of the hologram recording apparatus in which the position ahead from the detected position of the boundary by the predetermined size of the offset portion is detected as the position on the hologram recording layer at which the record information is to be recorded next, as described above, if a track pitch of the hologram recording medium is less than a size of a diameter of a record mark, which is formed on the hologram recording layer by recording the record information, the predetermined size may be a size of an area portion required not to make the record mark of the record information to be recorded next overlap the record mark of the record information previously recorded.

By virtue of such construction, if the recording is restarted (i.e. additionally recorded), new record information can be recorded without overlapping the record mark of the record information which is recorded before. By this, it is possible to preferably receive the aforementioned various benefits while multiplex-recording of the record information.

Incidentally, even if the track pitch of the hologram recording medium is greater than the size of the diameter of the record mark, the predetermined size may be the size of the area portion required not to make the record mark of the record information to be recorded next overlap the record mark of the record information previously recorded. That is, the state "that the predetermined size is the size of the diameter of the record mark" indicates the state that the record mark of the record information to be recorded next does not overlap the record mark of the record information previously recorded.

In another aspect of the hologram recording apparatus of the present invention, the second recording device sets the area portion of the position information recording layer facing the area portion of the hologram recording layer in which the record information is recorded and a predetermined size of an offset portion following the area portion, in the recorded state, as the area portion of the position information recording layer corresponding to the area portion of the hologram recording layer in which the record information is recorded.

According to this aspect, by the operation of the second recording device, in addition to the area portion of the position information recording layer facing (e.g. in the same radial position as or in the same position as, viewed from the irradiation side of the laser light) the area portion of the hologram recording layer in which the record information is recorded, the predetermined size of the offset portion is set in the recorded state. By this, it is possible to detect the position at which the record information is to be recorded next in the hologram recording layer, relatively easily, while performing the multiplex-recording.

In an aspect of the hologram recording apparatus in which the area portion of the position information recording layer facing the area portion of the hologram recording layer in which the record information is recorded and the predetermined size of an offset portion following the area portion is set in the recorded state, as described above, if a track pitch of the hologram recording medium is greater than a size of a diameter of a record mark, which is formed on the hologram recording layer by recording the record information, the predetermined size may be at least the size of the diameter of the record mark.

By virtue of such construction, if the recording is restarted (i.e. additionally recorded or written once), new record information can be recorded without overlapping the record mark of the record information recorded before. By this, it is possible to preferably receive the aforementioned various benefits, while multiplex-recording of the record information.

In an aspect of the hologram recording apparatus in which the area portion of the position information recording layer facing the area portion of the hologram recording layer in which the record information is recorded and the predetermined size of an offset portion following the area portion is set in the recorded state, as described above, if a track pitch of the hologram recording medium is less than a size of a diameter of a record mark, which is formed on the hologram recording layer by recording the record information, the predetermined size may be a size of an area portion required not to make the record mark of the record information to be recorded next overlap the record mark of the record information previously recorded.

By virtue of such construction, if the recording is restarted (i.e. additionally recorded or written once), new record information can be recorded without overlapping the record mark of the record information recorded before. By this, it is possible to preferably receive the aforementioned various benefits, while multiplex-recording of the record information.

Incidentally, even if the track pitch of the hologram recording medium is greater than the size of the diameter of the record mark, the predetermined size may be the size of the area portion required not to make the record mark of the record information to be recorded next overlap the record mark of the record information previously recorded. That is, the state "that the predetermined size is the size of the diameter of the record mark" indicates the state that the record mark of the record information to be recorded next does not overlap the record mark of the record information previously recorded.

In an aspect of the hologram recording apparatus in which the area portion of the position information recording layer facing the area portion of the hologram recording layer in which the record information is recorded and the predetermined size of an offset portion following the area portion is set in the recorded state, as described above, it may be further provided with a first detecting device for detecting a position of a boundary between the area portion in the recorded state and an area portion in an unrecorded state in the position information recording layer; and a second detecting device for detecting the detected position of the boundary as a position on the hologram recording layer at which the record information is to be recorded next.

By virtue of such construction, by the operations of the first detecting device and the second detecting device, it is possible to detect the position at which the record information is to be recorded next in the hologram recording layer, relatively easily.

(Hologram Recording Method)

The above object of the present invention can be also achieved by a hologram recording method of recording record information into a hologram recording medium on which a hologram recording layer and a position information recording layer are laminated, the record information being recorded into the hologram recording layer, the hologram recording method provided with: a first recording process of recording the record information into the hologram recording layer; and a second recording process of setting an area portion of the position information recording layer in a recorded state, the area portion of the position information recording layer corresponding to an area portion of the hologram recording layer in which the record information is recorded.

According to the hologram recording method of the present invention, it is possible to receive the same various benefits as those of the hologram recording apparatus of the present invention described above.

Incidentally, in response to various aspects as those of the hologram recording apparatus of the present invention, the hologram recording method of the present invention can also employ various aspects.

(Computer Program)

The above object of the present invention can be also achieved by a computer program for hologram recording control to control a computer provided in the aforementioned hologram recording apparatus of the present invention (including its various aspects), the computer program making the computer function as at least one portion of the first recording device and the second recording device.

According to the computer program of the present invention, the aforementioned hologram recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned hologram recording apparatus of the present invention, the computer program of the present invention can also employ various aspects.

The above object of the present invention can be also achieved by a computer program product in a computer-readable medium for tangibly embodying a program of instructions executable by a computer provided in the aforementioned hologram recording apparatus of the present invention (including its various aspects), the computer program product making the computer function as at least one portion of the first recording device and the second recording device.

According to the computer program product of the present invention, the aforementioned hologram recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, into the computer via a communication device. More specifically, the computer program product may include computer readable codes to cause the computer (or may comprise computer readable instructions for causing the computer) to function as the aforementioned hologram recording apparatus of the present invention.

(Hologram Recording Medium)

The above object of the present invention can be also achieved by a hologram recording medium provided with: a hologram recording layer in which record information is recorded; and a position information recording layer whose area portion corresponding to an area portion of the hologram recording layer in which the record information is recorded is set in a recorded state.

According to the hologram recording medium of the present invention, it is possible to receive the same various benefits as those of the hologram recording apparatus of the present invention described above.

Incidentally, in response to various aspects as those of the hologram recording apparatus of the present invention, the hologram recording medium of the present invention can also employ various aspects.

These effects and other advantages of the present invention will become more apparent from the embodiments explained below.

As explained above, according to the hologram recording apparatus, it is provided with the first recording device and the second recording device. According to the hologram recording method, it is provided with the first recording process and the second recording process. According to the computer program of the present invention, it makes a computer function as at least one portion of the first recording device and the second recording device. According to the hologram recording medium of the present invention, it is provided with the hologram recording layer and the position information recording layer. Therefore, it is possible to detect the position at which the record information is to be recorded next in the hologram recording layer, relatively easily.

BRIEF DESCRIPTION OF DRAWINGS

FIG. 1 are a cross sectional view and a plan view conceptually showing the basic structure of a hologram recording medium in an embodiment.

FIG. 2 is a block diagram conceptually showing the basic structure of a hologram recording/reproducing apparatus in an embodiment.

FIG. 3 is a block diagram conceptually showing, in particular, the basic structure of an optical system disposed in an optical pickup in the hologram recording/reproducing apparatus in the embodiment.

FIG. 4 are schematic diagrams showing one specific example of a 2-dimensional digital modulation method for data.

FIG. 5 are schematic diagrams showing another specific example of the 2-dimensional digital modulation method for data.

FIG. 6 is a plan view conceptually showing a data recording aspect on a hologram recording layer of the hologram recording medium, FIG. 7 is a flowchart conceptually showing a flow of a data recording operation by the hologram recording/reproducing apparatus in the embodiment.

FIG. 8 are a cross sectional view and a plan view conceptually showing a recording state of the hologram recording medium in performing the recording operation on the hologram recording layer and the recording operation on a dye film.

FIG. 9 is a flowchart conceptually showing a flow of a NWA calculation operation in a step S103 in FIG. 8.

FIG. 10 is a cross sectional view conceptually showing a positional relationship between the NWA and a boundary of an area portion in a "recorded state" and an area portion in an "unrecorded state" in the dye film.

FIG. 11 are a cross sectional view and a plan view conceptually showing a recording state of the hologram recording medium in performing the recording operation on the hologram recording layer and the recording operation on the dye film, in a modified operation example.

FIG. 12 is a plan view conceptually showing the position of the NWA if a track pitch is less than the diameter of a record mark.

DESCRIPTION OF REFERENCE CODES 1 hologram recording medium
11 hologram recording layer
12 address information layer
13 dye film
100 pickup
101 recording/reproduction laser
104 spatial modulator
108 2D sensor
121 servo laser
300 hologram recording/reproducing apparatus
313 signal recording/reproducing device
314, 319 CPU

BEST MODE FOR CARRYING OUT THE INVENTION

Hereinafter, the best mode for carrying out the present invention will be explained in order in each embodiment with reference to the drawings.

(1) Hologram Recording Medium

Firstly, with reference to FIG. 1 the basic structure of a hologram recording medium in an embodiment of the present invention will be explained. FIG. 1 are a cross sectional view and a plan view conceptually showing the basic structure of the hologram recording medium in the embodiment.

As shown in each of FIG. 1(a) and FIG. 1(b), a hologram recording medium 1 is provided with a hologram recording layer 11; and an address information layer 12.

The hologram recording layer 11 is a layer to record therein video data, audio data, and other various data.

The address information layer 12, as shown in FIG. 1(b), is formed by forming a track 15 spirally or concentrically, centered on a center hole 14. The track 15 is wobbled (or oscillated) in predetermined cycles, and address information or the like is recorded by using the wobbling. Alternatively, the address information or the like may be recorded by using pre-pits, such as embossed pits, formed in advance.

On the address information layer 12, a dye film 13 is formed by a spin coat method or the like, wherein the dye film 13 constitutes one specific example of the "position information recording layer" of the present invention. The dye film 13 becomes in a recorded state (in other words, in a state that pigments are thermally broken), as occasion demands, in response to the recording of the data into the hologram recording layer 11. Thus, the dye film 13 is in an unrecorded state (in other words, pigments are not thermally broken), as an initial state before the data is recorded into the hologram recording layer 11.

(2) Basic Structure of Hologram Recording/Reproducing Apparatus

Next, with reference to FIG. 2, a hologram recording/reproducing apparatus will be explained as an embodiment of the hologram recording apparatus of the present invention. FIG. 2 is a block diagram conceptually showing the basic structure of the hologram recording/reproducing apparatus in the embodiment.

As shown in FIG. 2, a hologram recording/reproducing apparatus 300 is provided with: a disc drive 301 on which the hologram recording medium 1 is actually loaded and on which data recording and data reproduction are performed; and a host computer 302, such as a personal computer, for controlling the data recording and reproduction with respect to the disc drive 301.

The disc drive 301 is provided with: the hologram recording medium 1; a spindle motor 311: an optical pickup 100; a signal recording/reproducing device 313; a CPU (drive control device) 314; a memory 315; a data input/output control device 316; and a bus 317. Moreover, the host computer 302 is provided with: a data input/output control device 318; a CPU 319; a memory 320; a bus 321; an operation/display control device 322; an operation button 323; and a display panel 324.

The spindle motor 311 is intended to rotate and stop the hologram recording medium 1, and operates upon accessing the hologram recording medium 1. More specifically, the spindle motor 311 is constructed to rotate the hologram recording medium 1 at a predetermined speed and stop, under spindle servo from a not-illustrated servo unit or the like.

The optical pickup 100 is provided with a semiconductor laser device, a lens, and the like, in order to perform the data recording on the hologram recording medium 1. The detailed structure of the optical pickup 100 will be described later (refer to FIG. 3).

The signal recording/reproducing device 313 controls the spindle motor 311 and the optical pickup 312, to thereby perform the data recording into the hologram recording medium 1. More specifically, the signal recording/reproducing device 313 controls a spatial modulator 104 described later, to thereby generate a two-dimensional (2D) modulation image pattern according to the data to be recorded, and displays it on the spatial modulator 104. Moreover, the signal recording/reproducing device 313 performs a demodulation process or the like on a spatial modulation image pattern detected by a 2D sensor 108 described later, to thereby generate reproduction data and reproduces the reproduction data.

The memory 315 is used in the general data processing on the disc drive 301, including a buffer area for the data, an area used as an intermediate buffer when data is converted into the data that can be used on the signal recording/reproducing device 313, and the like. Moreover, the memory 315 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 314 is connected to the signal recording/reproducing device 313 and the memory 315 through the bus 317, and controls the entire disc drive 301 by giving an instruction to various controlling devices. Moreover, usually, software or firmware for operating the CPU 314 is stored in the memory 315.

The data input/output control device 316 controls the input/output of the data from the exterior with respect to the disc drive 301, to thereby perform import to and export from the data buffer on the memory 315. A drive control command issued from the external host computer 302 connected to the disc drive 301 through an interface, such as a SCSI and an ATAPI, is transmitted to the CPU 314 through the data input/output control device 316. Moreover, the data is also exchanged with the host computer 302 through the data input/output control device 316, in the same manner.

The operation/display control device 322 receives an operation instruction and performs display with respect to the host computer 302, and transmits an instruction by the operation button 323, such as an instruction to record, to the CPU 319. The CPU 319 may transmit a control command to the disc drive 301, through the data input/output control device 318, on the basis of instruction information from the operation/display control device 322, to thereby control the entire disc drive 301. In the same manner, the CPU 319 can transmit a command for requesting the disc drive 301 to transmit an operational state to the host, with respect to the disc drive 301. By this, the operational state of the disc drive 301, such as during recording, can be recognized, so that the CPU 319 can output the operational state of the disc drive 301 to the display panel 301, such as a fluorescent tube and an LCD, through the operation/display control device 322.

The memory 320 is an internal memory apparatus used by the host computer 302, and it is provided with: a ROM area in which a firmware program, such as BIOS (Basic Input/Output System), is stored; a RAM area in which variables necessary for the operation of an operating system and an application program or the like are stored; and the like. Moreover, the memory 320 may be connected to an external memory apparatus, such as a not-illustrated hard disk, through the data input/output control device 318.

One specific example used by combining the disc drive 301 and the host computer 302, as explained above, is household equipment, such as recorder equipment for recording and reproducing video images. The recorder equipment records a video signal from a broadcast reception tuner and an external connection terminal, onto a disc. The operation as the recorder equipment is performed by executing a program stored in the memory 320, on the CPU 319. Moreover, in another specific example, the disc drive 301 is a disc drive (hereinafter referred to as a "drive", as occasion demands), and the host computer 302 is a personal computer or a work station. The host computer, such as the personal computer, and the drive are connected through the data input/output control devices 316 and 318, such as the SCSI and the ATAPI, and application, such as writing software, installed in the host computer 302 controls the disc drive 301.

Next, the basic structure of the optical pickup 100 will be explained with reference to FIG. 3. FIG. 3 is a block diagram conceptually showing, in particular, the basic structure of an optical system disposed in the optical pickup 100 in the hologram recording/reproducing apparatus 300 in the embodiment.

As shown in FIG. 3, the optical pickup 100 is provided with: a recording/reproduction laser 101 which generates laser light for data recording or reproducing; and a servo laser 121 which generates red laser light for tracking servo control.

In the data recording, the laser light emitted from the recording/reproduction laser 101 is divided by a beam splitter 102 into a signal beam SB as objective light and a reference beam RB as reference light for recording. The signal beam SB is inputted to a spatial modulator 104. The spatial modulator 104 can be formed of e.g. a liquid crystal element and has a plurality of pixels arranged in a lattice pattern.

The spatial modulator 104 displays a 2D modulation image pattern, which includes white pixels and black pixels and which is obtained by 2D digital-modulating the user data to be recorded. And the spatial modulator 104 spatially-modulates the signal beam SB by using the 2D modulation image patterns.

The signal beam SB, which is spatially-modulated by the spatial modulator 104, and the reference beam RB, whose optical path is adjusted by mirrors 103 and 105, are merged on the same optical axis by a beam splitter 106, and then is transmitted through a half mirror 107 and a dichroic mirror 109 with wavelength selectivity, is focused by an objective lens 110, and is irradiated onto the hologram recording medium 1. As a result, the spatial-modulated signal beam SB and the reference beam RB form an interference pattern in the hologram recording medium 1 (more specifically, in the hologram recording layer 11), and the interference pattern is recorded into the hologram recording medium 1.

Now, with reference to FIG. 4 to FIG. 6, an explanation will be given on specific aspects of the 2D digital modulation. FIG. 4 are schematic diagrams showing one specific example of the 2-dimensional digital modulation method for data. FIG. 5 are schematic diagrams showing another specific example of the 2-dimensional digital modulation method for data. FIG. 6 is a plan view conceptually showing an aspect of data recording on the hologram recording layer 11 of the hologram recording medium 1.

As shown in FIG. 4(*a*), the data to be recorded into the hologram recording medium 1 (hereinafter referred to as "record data" as occasion demands), which are "0" and "1", are expressed by the combination of the white pixel and the black pixel. The vertical arrangement of the white pixel and the black pixel in this order corresponds to the record data "0", and the vertical arrangement of the black pixel and the white pixel in this order corresponds to the record data "1". This example is referred to as 1:2 difference modulation because 1-bit record data is converted to 2-bit (or 2 pixel) 2D modulation data.

FIG. 4(*b*) shows the 2D modulation data, which is obtained by 2D digital-modulating record data of "00101101" in this modulation method. That is, the 2D modulation data to which marker data, which indicates a reference position of the pixel, is added is displayed on the spatial modulator 104, as the white pixel and the black pixel. Incidentally, the spatial modulator 104 is driven to generate the white pixel portion and the black pixel portion, under the control of the signal recording/reproducing device 313, and it converts the record data to a 2D modulation image pattern. The laser light which enters the spatial modulator 104 is transmitted through the white pixel portion of the 2D modulation image pattern and is blocked in the black pixel portion. Thus, the signal beam SB optically spatial-modulated by the 2D modulation image pattern is emitted from the spatial modulator 104.

Incidentally, the aforementioned example is one example of the 2D-modulation, and the application of the present invention is not necessarily limited to the aforementioned modulation method.

For example, as shown in FIG. 5(a), 2D-modulation method may be a method of converting 2-bit record data to 4-bit 2D modulation data, i.e. a so-called 2:4 modulation method. In the 2:4 modulation method, for example, a 2D modulation image pattern in which only the upper left pixel of a 2×2 matrix pixels is white corresponds to record data of "00", a 2D modulation image pattern in which only the upper right pixel is white corresponds to record data of "01", a 2D modulation image pattern in which only the lower left pixel is white corresponds to record data of "10", and a 2D modulation image pattern in which only the lower right pixel is white corresponds to record data of "11".

Alternatively, as shown in FIG. 5(b), 2D-modulation may be a method of converting 6-bit record data to 9-bit 2D modulation data, i.e. a so-called 6:9 modulation method. In the 6:9 modulation method, 6-bit record data is expressed, depending on the positions of three white pixels, on a 3×3 matrix pixels.

Alternatively, any 2D digital modulation method may be used if capable of converting the record data to the 2D modulation image pattern and if capable of driving the spatial modulator 104 to spatial-modulate laser light.

As described above, the signal beam SB, optically spatial-modulated by the 2D modulation image pattern from the spatial modulator 104, and the reference beam RB form the interference pattern in the hologram recording medium 1 (more specifically, in the hologram recording layer 11). At this time, a record mark, as shown in FIG. 6, is formed on the surface of the hologram recording layer 11. By this, the record data is recorded into the hologram recording medium 1.

In FIG. 3 again, on the other hand, in the data reproduction, the spatial modulator 104 is controlled in a non-modulation condition (i.e. all-optical transmission condition). Thus, the laser light emitted from the recording/reproduction laser 101 passes through the half mirror 102, the half mirror 106, the half mirror 107, the dichroic mirror 109, and the objective lens 110, without being modulated by the spatial modulator 104, and is irradiated onto the hologram recording medium 1. This laser light becomes reference light for reproduction. In the hologram recording medium 1, detection light is generated from the reference light for reproduction and the interference pattern recorded in the hologram recording medium 1, and the detection light passes through the objective lens 110 and the dichroic mirror 109, and is reflected by the half mirror 107, and enters the 2D sensor 108. The 2D sensor 108 may be, for example, a CCD array, a CMOS sensor, or the like, and it outputs an electrical signal according to the quantity of incident light. In this manner, the 2D modulation image pattern with the white and black pixels, displayed by the spatial modulator 104 in the recording, is formed on the 2D sensor 108, and the SD modulation image pattern is detected. The detected 2D modulation image pattern is demodulated or the like by the operation of the signal recording/reproducing device 313, resulting in the reproduction of the recorded data or the like.

On the other hand, the laser light emitted from the servo laser 121 (hereinafter referred to as a "servo beam TB") passes through a half mirror 122, is reflected by a mirror 123, and is further reflected by the dichroic mirror 109 with wavelength selectivity, and enters the objective lens 110. The objective lens 110 focuses the servo beam TB on the hologram recording medium 1 (more specifically, the address information layer 12), together with the light beam from the recording/reproduction laser 101. The servo beam TB is reflected by a reflective layer disposed on the back surface of the hologram recording medium 1, and is further reflected by the dichroic mirror 109, the mirror 123, and the mirror 122. Then, the servo beam TB is received by a four-division photo detector 125 through a cylindrical lens 124. The four-division photo detector 125 outputs an electrical signal corresponding to the quantity of received light. Thus, from a difference (e.g. push-pull signal) in the quantity of light of each light receiving area of the four-division photo detector 125, a tracking error signal is obtained, which indicates how much deviation exists from the guide groove for tracking servo control, which is formed on the hologram recording medium 1, to perform the tracking servo control. In addition, from a result of the detection by the four-division photo detector 125, the address information or the like can be obtained.

Incidentally, a combination of the recording/reproduction laser 101 and the CPU 314 or the like described above constitutes one specific example of the "first recording device" of the present invention. A combination of the servo laser 121 and the CPU 314 or the like described above constitutes one specific example of the "second recording device" of the present invention.

(3) Operation Principle of Hologram Recording/Reproducing Apparatus

Next, with reference to FIG. 7, an explanation will be given on an operation principle of the hologram recording/reproducing apparatus 300 in the embodiment. FIG. 7 is a flowchart conceptually showing a flow of a data recording operation by the hologram recording/reproducing apparatus 300 in the embodiment.

As shown in FIG. 7, firstly, the hologram recording medium 1 is loaded on the disc drive 301 (step S101).

Then, under the control of the CPU 314 or the CPU 319, it is judged whether or not the data recording into the loaded hologram recording medium 1 is an "additional data recording operation" (step S102). Specifically, if the data is recorded halfway on the loaded hologram recording medium 1, it is judged that the data recording into the loaded hologram recording medium 1 is the "additional data recording operation". On the other hand, if the data is not recorded at all (or blank) on the loaded hologram recording medium 1, it is judged that the data recording into the loaded hologram recording medium 1 is not the "additional data recording operation".

As a result of the judgment in the step S102, if it is judged that the data recording into the loaded hologram recording medium 1 is the "additional data recording operation" (the step S102: Yes), the disc drive 301 detects an address at which the data is to be recorded next (NWA: Next Writable Address) on the loaded hologram recording medium 1, under the control of the CPU 314, which constitutes one specific example of each of the "first detecting device" and the "second detecting device" of the present invention (step S103). The operation of detecting the NWA will be detailed later (refer to FIG. 9 and FIG. 10).

After that, the detected NWA is passed from the disc drive 301 to the host computer 302. Then, under the control of the CPU 314 or the CPU 319, the data is sequentially recorded from the position on the hologram recording layer 11 indicated by the detected NWA in the step S103 (step S104). The data recording into the hologram recording layer 11 is performed by the laser light emitted from the recording/reproduction laser 101, as described above.

In addition, under the control of the CPU 314 or the CPU 319, a partial or entire area portion of the dye film 13 is set in a recorded state, along with the data recording in the hologram recording layer 11 (step S105). The recording into the dye film 13 is performed by the laser light emitted from the servo laser 121.

Now, with reference to FIG. 8, a detailed explanation will be given on the operation of setting the partial or entire area portion of the dye film 13 in the recorded state. FIG. 8 are a cross sectional view and a plan view conceptually showing a recording state of the hologram recording medium 1 in performing the recording operation on the hologram recording layer 11 and the recording operation on the dye film 13.

As shown in the cross sectional view of the hologram recording medium 1 shown in FIG. 8(*a*), it is assumed that the data is recorded to a position indicated by a last recorded address (LRA) in the hologram recording layer 11. Incidentally, in FIG. 8(*a*), shift-multiplex-recording is performed, which is one of the features of the hologram recording.

At this time, as shown in the cross sectional view of the hologram recording medium 1 shown in FIG. 8(*b*), the dye film 13, which reaches an area portion facing (i.e. located in the same radial position) the area portion indicated by the LRA in the hologram recording layer 11, is set in the recorded state. In other words, the area portion in the dye film 13 facing the area portion in the hologram recording layer 11 in which the data is recorded is set in the recorded state.

Here, the dye film 13 may be set in the recorded state by irradiating the laser light with a certain power (specifically, with a power to the extent that allows thermal destruction with respect to the dye film 13) from the servo laser 121. That is, the dye film 13 may be set in the recorded state by recording dummy data or the like, which has no meaning. Alternatively, the dye film 13 may be set in the recorded state by recording video data, audio data, and other various data into the dye film 13.

Moreover, the recording into the dye film 13 may be performed simultaneously with the data recording into the hologram recording layer 11. Alternatively, the recording into the dye film 13 may be performed after the data recording into the hologram recording layer 11 is once stopped.

In FIG. 7 again, on the other hand, as a result of the judgment in the step S102, if it is judged that the data recording into the loaded hologram recording medium 1 is not the "additional data recording operation" (the step S102: No), the data is recorded from a predetermined position in the hologram recording layer 11 under the control of the CPU 314 or the CPU 319 (the step S104). In addition, under the control of the CPU 314 or the CPU 319, the partial or entire area portion of the dye film 13 is set in the recorded state, along with the data recording in the hologram recording layer 11 (the step S105).

After that, under the control of the CPU 314 or the CPU 319, it is judged whether or not the data recording operation is ended (step S106).

As a result of the judgment in the step S106, if it is judged that the data recording operation is not ended (the step S106: No), the operational flow returns to the step S102 again, and the operations from the step S102 to the step S106 are repeated. In this case, if the data recording operation is restarted after the temporary stop or interruption, it is judged that the operation is the "additional data recording operation" in the step S102.

On the other hand, as a result of the judgment in the step S106, if it is judged that the data recording operation is ended (the step S106: Yes), the data recording operation is ended.

Next, with reference to FIG. 9, the operation of calculating the NWA in the step S103 in FIG. 8 will be explained. FIG. 9 is a flowchart conceptually showing a flow of the NWA calculation operation in the step S103 in FIG. 8.

As shown in FIG. 9, firstly, management information, such as the LRA, is obtained from a management information area disposed in the hologram recording layer 11 (step S201). After that, seeking is performed to the vicinity of the LRA obtained in the step S201 (step S202). That is, the optical pickup 100 is displaced to the vicinity of the LRA.

Then, under the control of the CPU 314 or the CPU 319, a boundary between the area portion in the "recorded state" and the area portion in the "unrecorded state" in the dye film 13 is detected (step S203). Here, by seeking near the LRA while irradiating the laser light from the servo laser 121 and monitoring the intensity of the reflected light of the laser light, the boundary between the area portion in the "recorded state" and the area portion in the "unrecorded state" in the dye film 13 is detected. As a result, an address of the boundary between the area portion in the "recorded state" and the area portion in the "unrecorded state" in the dye film 13 is detected.

After that, under the control of the CPU 314 or the CPU 319, the NWA is detected (in other words, calculated) on the basis of the address of the boundary detected in the step S203 (step S204).

Next, with reference to FIG. 10, a detailed explanation will be given on the NWA detected from the address of the boundary between the area portion in the "recorded state" and the area portion in the "unrecorded state" in the dye film 13. FIG. 10 is a cross sectional view conceptually showing a positional relationship between the NWA and the boundary between the area portion in the "recorded state" and the area portion in the "unrecorded state" in the dye film 13.

As shown in each of the cross sectional view of the hologram recording medium 1 shown in the upper part of FIG. 10 and the plan view of the hologram recording medium shown in the lower part of FIG. 10, a value obtained by adding a predetermined offset value to the address of the boundary between the area portion in the "recorded state" and the area portion in the "unrecorded state" in the dye film 13 is detected as the NWA.

As the offset value, a predetermined value is used so as to realize that a record mark formed lastly when the recording operation is once stopped does not overlap a record mark formed firstly when the recording is restarted. Specifically, it is necessary to distance the record mark formed lastly when the recording operation is once stopped from the record mark formed firstly when the recording is restarted, by at least the size of the diameter of the record mark. In addition, after the data is recorded, a material which constitutes the hologram recording layer 11 may heat shrink or the like, to thereby cause a physical difference at a recording boundary between the record mark and its surroundings in some cases. Thus, if such a physical difference is caused, the data is newly recorded (i.e. needs to be written once) with considering the extent of the physical difference. Thus, a value which is obtained by converting a sum of the extent of the physical difference caused by the heat shrink or the like and the diameter of the record mark into the address value is used as the offset value.

Incidentally, in FIG. 10, the explanation is given under the assumption that the track pitch of the hologram recording medium 1 is greater than the diameter of the record mark.

After that, the data is recorded from the position of the NWA. That is, the laser light is irradiated as shown in a dashed line in the upper part of FIG. 10, and the record mark is formed as shown in a dashed line in the lower part of FIG. 10. At this time, it is necessary to set the area portion in the dye film 13 between the previous LRA and the NWA, in the recorded state.

As explained above, by setting the dye film 13 formed on the address information layer 12 in the recorded state in accordance with the data recording in the hologram recording layer 11, it is possible to detect the NWA, relatively easily. Specifically, in order to detect the NWA, it is unnecessary to reproduce the data recorded in the hologram recording layer 11, and it is possible to detect the NWA in the hologram recording layer 11, relatively easily, on the basis of the position of the boundary between the area portion in the recorded state and the area portion in the unrecorded state in the dye film 13.

Incidentally, in the aforementioned embodiment, when the additional data recording operation is performed, the NWA is detected by detecting the boundary between the area portion in the recorded state and the area portion in the unrecorded state in the dye film 13. However, if information about the NWA (e.g. information which indicates the address value or the like) is directly recorded in the hologram recording medium 1 or if the information about the NWA is stored in the memory 315 of the disc drive 301 or the memory 320 of the host computer 302, the NWA may be used to perform the aforementioned recording operation. In this case, it is not always necessary to detect the boundary between the area portion in the recorded state and the area portion in the unrecorded state in the dye film 13 in order to detect the NWA.

Moreover, in the aforementioned embodiment, the dye film 13 which is unrecorded in the initial state is set in the recorded state in accordance with the data recording in the hologram recording layer 11; however, the dye film 13 which is recorded in the initial state may be set in the unrecorded state in accordance with the data recording in the hologram recording layer. Moreover, the dye film 13 in a first state in the initial state may be set in a second state in accordance with the data recording in the hologram recording layer 11. Even if it is constructed in this manner, it is possible to detect the boundary between the area portion in the "recorded state (or first state)" and the area portion in the "unrecorded state (or second state)" in the dye film 13, so that it is possible to receive the aforementioned various benefits.

Moreover, what is formed on the address information layer 12 is not limited to the dye film 13, but any material that can change the state can be used instead of the dye film 13. For example, a phase change film or the like can be used instead of the dye film 13.

(4) Modified Operation Example

Next, with reference to FIG. 11 and FIG. 12, a modified operation example of the hologram recording/reproducing apparatus 300 in the embodiment will be explained. FIG. 11 are a cross sectional view and a plan view conceptually showing a recording state of the hologram recording medium 1 in performing the recording operation on the hologram recording layer 11 and the recording operation on the dye film 13, in the modified operation example. FIG. 12 is a plan view conceptually showing the position of the NWA if a track pitch is less than the diameter of a record mark.

As shown in FIG. 11(a), it is assumed that the data is recorded to a position indicated by a last recorded address (LRA) in the hologram recording layer 11.

At this time, the dye film 13 is set in the recorded state to an area portion ahead from the area portion indicated by the LRA in the hologram recording layer 11 by the aforementioned offset value in a recording direction.

By setting the dye film 13 in the recorded state in this manner, the address of the boundary between the area portion in the "recorded state" and the area portion in the "unrecorded state" in the dye film 13 is detected as the NWA. That is, it is unnecessary to consider the offset value in detecting the NWA, so that it is possible to detect the NWA more quickly. Obviously, however, it is necessary to consider the offset value when the dye film 13 is set in the recorded state.

Incidentally, even in FIG. 11, the explanation is given under the assumption that the track pitch of the hologram recording medium 1 is greater than the diameter of the record mark.

Incidentally, with reference to FIG. 12, an explanation will be given on the case that the track pitch of the hologram recording medium 1 is less than the diameter of the record mark.

As shown in FIG. 12, if the track pitch of the hologram recording medium 1 is less than the diameter of the record mark, the record marks overlap not only in the recording direction (i.e. a direction along the track) but also in the radial direction.

Thus, when the NWA is detected as shown in FIG. 8 and FIG. 10 or when the dye film 13 is set in the recorded state as shown in FIG. 11, it is necessary to use such an offset value that all the record marks formed until the recording operation is once stopped and the record mark firstly formed when the recording is restarted doe not overlap not only in the recording direction (i.e. the direction along the track) but also in the radial direction. Thus, the NWA is located, for example, on outer side by several tracks than the position indicated by the LRA. The offset value is set, as occasion demands, under the control of the CPU 314 or the CPU 319, in accordance with the size of the track pitch, the diameter of the record mark, to which track the data is recorded, or the like.

As described above, if the track pitch of the hologram recording medium 1 is less than the diameter of the record mark, the calculation of the offset value becomes more or less complicated. Thus, if the track pitch of the hologram recording medium 1 is less than the diameter of the record mark, as in the modified operation example shown in FIG. 11, it is preferable to set the dye film 13 in the recorded state to the area portion in the dye film ahead from the area portion indicated by the LRA in the hologram recording layer 11 by the offset value. By virtue of such construction, there is such an advantage that it is unnecessary to perform the complicated calculation in detecting the NWA and it is possible to start the additional data recording, relatively quickly.

Moreover, although it is necessary to calculate the offset value when the dye film 13 is set in the recorded state, the offset value is preferably calculated by using a time when the data recording is not performed (e.g. a time between when the data recording is once stopped and when it is restarted). By this, it is possible to calculate the offset value without significant influence of the calculation of the offset value with respect to the data recording operation or the like by the hologram recording/reproducing apparatus 300.

The present invention is not limited to the aforementioned embodiments, and various changes may be made without departing from the essence or spirit of the invention which can be read from the claims and the entire specification. A hologram recording apparatus and method, a computer program, and a hologram recording medium, which involve such changes, are also intended to be within the technical scope of the present invention.

INDUSTRIAL APPLICABILITY

The hologram recording apparatus and method, the computer program, and the hologram recording medium according to the present invention can be applied to a hologram recording medium on which the data to be recorded is recorded as an interference pattern, and further to a hologram recording apparatus for recording information into the hologram recording medium. Moreover, they can be applied to the hologram recording apparatus or the like which is mounted on various computer equipment for consumer use or for commercial use, or which can be connected to various computer equipment.

The invention claimed is:

1. A hologram recording apparatus for recording record information into a hologram recording medium on which a hologram recording layer and a position information recording layer are laminated, the record information being recorded into the hologram recording layer, said hologram recording apparatus comprising:
a first recording device for recording the record information into the hologram recording layer; and
a second recording device for setting an area portion of the position information recording layer in a recorded state, the area portion of the position information recording layer corresponding to an area portion of the hologram recording layer in which the record information is recorded, wherein
the position information recording layer includes a dye film, and
said second recording device sets the area portion of the position information recording layer in the recorded state by thermal destruction of the dye film.

2. The hologram recording apparatus according to claim 1, wherein
said first recording device sequentially records the record information, and
said second recording device sequentially sets the area portion of the position information recording layer in the recorded state.

3. The hologram recording apparatus according to claim 1, wherein said second recording device sets the area portion of the position information recording layer facing the area portion of the hologram recording layer in which the record information is recorded, in the recorded state, as the area portion of the position information recording layer corresponding to the area portion of the hologram recording layer in which the record information is recorded.

4. The hologram recording apparatus according to claim 1, wherein said second recording device sets the area portion of the position information recording layer facing the area portion of the hologram recording layer in which the record information is recorded and a predetermined size of an offset portion following the area portion, in the recorded state, as the area portion of the position information recording layer corresponding to the area portion of the hologram recording layer in which the record information is recorded.

5. The hologram recording apparatus according to claim 4, wherein if a track pitch of the hologram recording medium is greater than a size of a diameter of a record mark, which is formed on the hologram recording layer by recording the record information, the predetermined size is at least the size of the diameter of the record mark.

6. The hologram recording apparatus according to claim 4, wherein if a track pitch of the hologram recording medium is less than a size of a diameter of a record mark, which is formed on the hologram recording layer by recording the record information, the predetermined size is a size of an area portion required not to make the record mark of the record information to be recorded next overlap the record mark of the record information previously recorded.

7. The hologram recording apparatus according to claim 4, further comprising:
a first detecting device for detecting a position of a boundary between the area portion in the recorded state and an area portion in an unrecorded state in the position information recording layer; and
a second detecting device for detecting a position of the detected boundary as a position on the hologram recording layer at which the record information is to be recorded next.

8. A hologram recording apparatus for recording record information into a hologram recording medium on which a hologram recording layer and a position information recording layer are laminated, the record information being recorded into the hologram recording layer, said hologram recording apparatus comprising:
a first recording device for recording the record information into the hologram recording layer;
a second recording device for setting an area portion of the position information recording layer in a recorded state, the area portion of the position information recording layer corresponding to an area portion of the hologram recording layer in which the record information is recorded;
a first detecting device for detecting a position of a boundary between the area portion in the recorded state and an area portion in an unrecorded state in the position information recording layer; and
a second detecting device for detecting a position on the hologram recording layer at which the record information is to be recorded next, on the basis of the detected position of the boundary.

9. The hologram recording apparatus according to claim 8, wherein said second detecting device detects a position ahead from the detected position of the boundary by a predetermined size of an offset portion, as the position on the hologram recording layer at which the record information is to be recorded next.

10. The hologram recording apparatus according to claim 9, wherein if a track pitch of the hologram recording medium is greater than a size of a diameter of a record mark, which is formed on the hologram recording layer by recording the record information, the predetermined size is at least the size of the diameter of the record mark.

11. The hologram recording apparatus according to claim 9, wherein if a track pitch of the hologram recording medium is less than a size of a diameter of a record mark, which is formed on the hologram recording layer by recording the record information, the predetermined size is a size of an area portion required not to make the record mark of the record information to be recorded next overlap the record mark of the record information previously recorded.

12. A hologram recording method of recording record information into a hologram recording medium on which a hologram recording layer and a position information recording layer are laminated, the record information being recorded into the hologram recording layer, said hologram recording method comprising:
a first recording process of recording the record information into the hologram recording layer; and
a second recording process of setting an area portion of the position information recording layer in a recorded state, the area portion of the position information recording layer corresponding to an area portion of the hologram recording layer in which the record information is recorded, wherein the position information recording layer includes a dye film, and said second recording process sets the area portion of the position information recording layer in the recorded state by thermal destruction of the dye film.

13. A hologram recording method of recording record information into a hologram recording medium on which a hologram recording layer and a position information recording layer are laminated, the record information being recorded into the hologram recording layer, said hologram recording method comprising:

a first recording process of recording the record information into the hologram recording layer;

a second recording process of setting an area portion of the position information recording layer in a recorded state, the area portion of the position information recording layer corresponding to an area portion of the hologram recording layer in which the record information is recorded;

a first detecting process of detecting a position of a boundary between the area portion in the recorded state and an area portion in an unrecorded state in the position information recording layer; and a second detecting process of detecting a position on the hologram recording layer at which the record information is to be recorded next, on the basis of the detected position of the boundary.

14. A computer program product in a computer-readable medium for tangibly embodying a program of instructions executable by a computer provided in a hologram recording apparatus for recording record information into a hologram recording medium on which a hologram recording layer and a position information recording layer are laminated, the record information being recorded into the hologram recording layer, said hologram recording apparatus comprising: a first recording device for recording the record information into the hologram recording layer; and a second recording device for setting an area portion of the position information recording layer in a recorded state, the area portion of the position information recording layer corresponding to an area portion of the hologram recording layer in which the record information is recorded, wherein the position information recording layer includes a dye film, and said second recording device sets the area portion of the position information recording layer in the recorded state by thermal destruction of the dye film, the computer program making the computer function as at least one portion of said first recording device and said second recording device.

15. A computer program product in a computer-readable medium for tangibly embodying a program of instructions executable by a computer provided in a hologram recording apparatus for recording record information into a hologram recording medium on which a hologram recording layer and a position information recording layer are laminated, the record information being recorded into the hologram recording layer, said hologram recording apparatus comprising: a first recording device for recording the record information into the hologram recording layer; a second recording device for setting an area portion of the position information recording layer in a recorded state, the area portion of the position information recording layer corresponding to an area portion of the hologram recording layer in which the record information is recorded; a first detecting device for detecting a position of a boundary between the area portion in the recorded state and an area portion in an unrecorded state in the position information recording layer; and a second detecting device for detecting a position on the hologram recording layer at which the record information is to be recorded next, on the basis of the detected position of the boundary, the computer program making the computer function as at least one portion of said first recording device, said second recording device, said first detecting device, said second detecting device.

16. A hologram recording medium comprising:

a hologram recording layer in which record information is recorded; and a position information recording layer whose area portion corresponding to an area portion of the hologram recording layer in which the record information is recorded is set in a recorded state, wherein the position information recording layer includes a dye film, and the area portion of the position information recording layer is set in the recorded state by thermal destruction of the dye film.

17. A holographic recording medium comprising:

a holographic recording layer in which record information is recorded; and a position information recording layer whose area portion corresponding to an area portion of the holographic recording layer in which the record information is recorded is set in a recorded state, wherein a position on the holographic recording layer at which the record information is to be recorded next, is detected on the basis of the detected position of the boundary.

* * * * *